(12) United States Patent
Lesko

(10) Patent No.: US 6,543,391 B2
(45) Date of Patent: Apr. 8, 2003

(54) PET EXERCISER

(76) Inventor: Stephen J. Lesko, 14045 Fairgate Blvd., Newbury, OH (US) 44065-9569

( * ) Notice: Subject to any disclaimer, the term of this patent is extended or adjusted under 35 U.S.C. 154(b) by 2 days.

(21) Appl. No.: 09/789,030

(22) Filed: Feb. 20, 2001

(65) Prior Publication Data

US 2002/0112675 A1 Aug. 22, 2002

(51) Int. Cl.⁷ .................................................. A01K 3/00
(52) U.S. Cl. ........................................ 119/791; 119/788
(58) Field of Search ................................ 119/786, 787, 119/771, 788, 791

(56) References Cited

U.S. PATENT DOCUMENTS

| | | |
|---|---|---|
| 417,617 A | 12/1889 | Williams |
| 429,111 A | 6/1890 | Bailey |
| 843,543 A | 2/1907 | Matsumoto |
| 1,699,308 A * | 1/1929 | Postings .................. 119/704 |
| 2,314,941 A | 3/1943 | Hayden |
| 3,244,149 A | 4/1966 | Bosko et al. |
| 3,508,525 A | 4/1970 | Sawyer |
| 3,921,589 A | 11/1975 | McGahee |
| D250,281 S | 11/1978 | Laukhuf ....................... D23/9 |
| 4,144,843 A | 3/1979 | Schrougham |
| 4,800,843 A | 1/1989 | Wendling |
| 5,044,323 A | 9/1991 | Papak |
| 5,161,487 A | 11/1992 | Miller |
| 5,526,774 A * | 6/1996 | Swindall et al. ............ 119/787 |
| 5,732,659 A | 3/1998 | Wiggins ..................... 119/787 |
| 5,785,007 A | 7/1998 | Sauber et al. ............... 119/771 |
| 5,957,092 A | 9/1999 | Colsch ....................... 119/787 |

* cited by examiner

*Primary Examiner*—Robert P. Swiatek
(74) *Attorney, Agent, or Firm*—Renner, Otto, Boisselle & Sklar, LLP

(57) ABSTRACT

A large pet exerciser utilizes but two readily available major components. One is a galvanized pipe or post embedded in concrete. The other major component is an extension or tension spring having a loop or ring on each end. The spring is anchored in the top of the post by means of one loop while a leash is connected to the other or extending top loop. The spring not only elongates when subject to tensile forces, but being mostly free of the post flexes or bends laterally of the post axis in any azimuth or direction. Both actions of the spring exert a bias on any pull by a pet secured to a leash in turn secured to the top or projecting end of the spring. This provides significant decelerating strain relief.

7 Claims, 1 Drawing Sheet

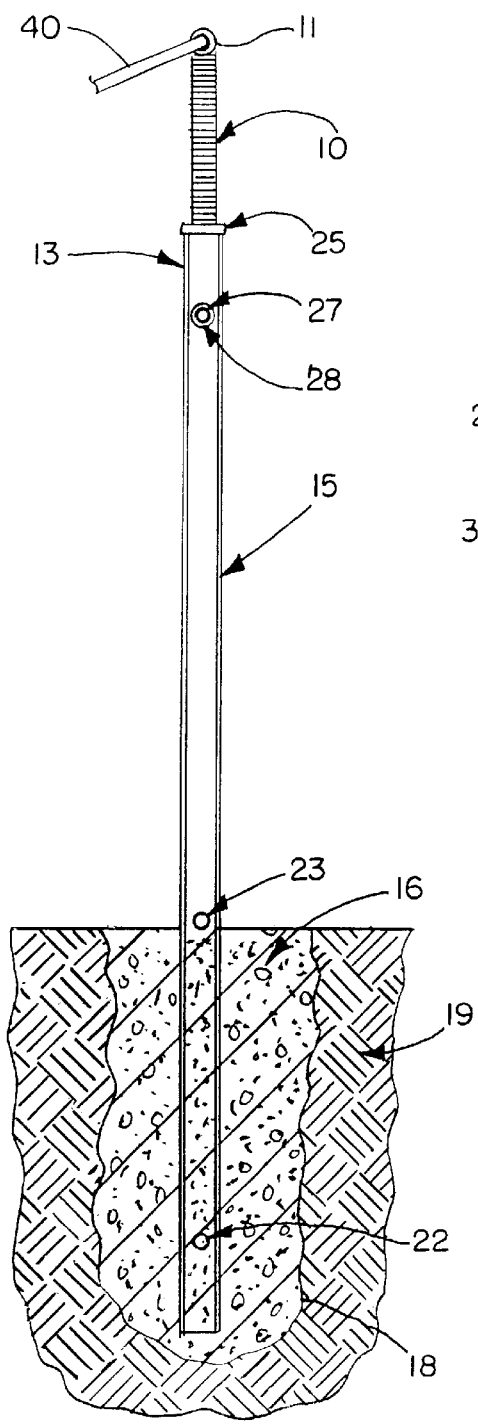
FIG. 1
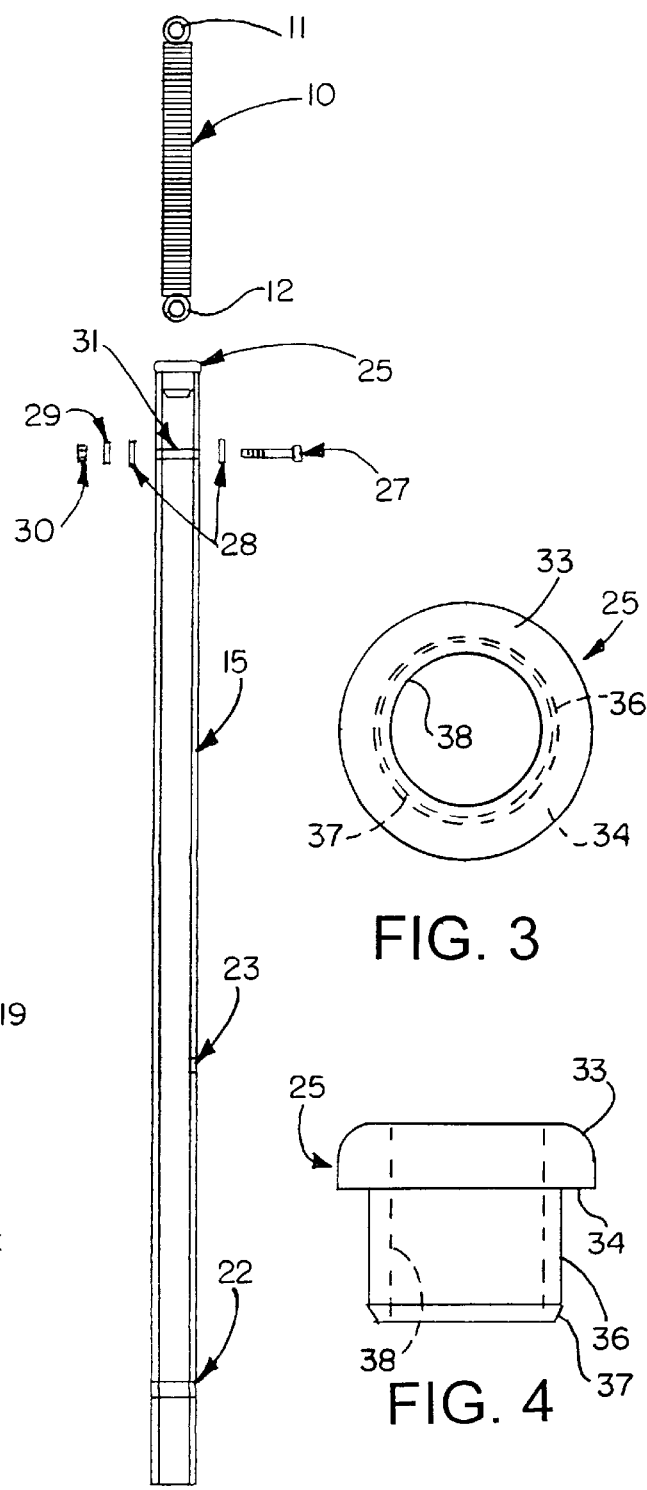
FIG. 2
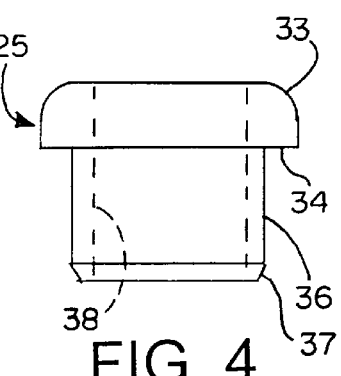
FIG. 3
FIG. 4

PET EXERCISER

DISCLOSURE

This invention relates generally as indicated to a pet exerciser, and more particularly to an exerciser for large pets, which incorporates a universal no-tangle strain relief.

BACKGROUND OF THE INVENTION

Exercising large pets with a walking leash can be exhausting. Not only is it hard to keep the pet properly tethered or under control, it is hard to keep up with the pet. In the end, the owner is not sure who is walking whom. Also, both the pet and owner are subject to repeated various tugs and strains which are a discomfort to both. Although some leashes incorporate draw bar springs, the deceleration or strain relief is inadequate or insignificant.

If a large pet tether is fixed, the tug or strain can literally destroy any post or anchor to which the tether is attached, or entangle and harm an unattended pet.

While pet exercisers or animal tethers have used springs as seen, for example, in prior U.S. Pat. Nos. 429,111, 843,543 and 1,699,308, these devices tend to be costly using a number of non-standard parts, are difficult to assemble and are not very sturdy. In prior Pat. No. 429,111, a rather lengthy rod projects from the upper end of a coil spring while the lower end is secured to a ground screw shank. A chain is connected to the upper end of the rod. If tension on the chain is suddenly released, the device can act as a whip creating an abrupt tug on the pet. The horse hitching device of U.S. Pat. No. 843,543 uses a weight and three different types and sizes of springs. In U.S. Pat. No. 1,699,308, the spring biases the bent pole or rod to an elevated position.

Other examples of animal exercisers or tether are seen in Design Pat. No. 250,281 and U.S. Pat. Nos. 417,617, 2,314,941, 3,244,149, 3,508,525, 3,921,589, 4,144,843, 4,800,843, 5,044,323, 5,161,487, 5,732,659, 5,785,007 and 5,957,092.

SUMMARY OF THE INVENTION

A large pet exerciser utilizes but two readily available major components. One is a galvanized pipe or post embedded in concrete. The other major component is an extension or tension spring having a loop or ring on each end. The spring is anchored in the top of the post by means of one loop while a leash is connected to the other or extending top loop. The spring not only elongates when subject to tensile forces, but being mostly free of the post flexes or bends laterally of the post axis in any azimuth or direction. Both actions of the spring exert a bias on any pull by a pet secured to a leash in turn secured to the top or projecting end of the spring. This provides significant decelerating strain relief.

The post is embedded in and filled with concrete up to a drain hole to keep water from collecting in the post. The top of the post is fitted with a plastic bushing cap to protect both the top of the post and the spring projecting from the top of the post. The spring is anchored to the post by conventional fasteners such as a nut, bolt and washer assembly.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 is an assembled view of the pet exerciser of the present invention embedded in concrete;

FIG. 2 is an exploded view of the components;

FIG. 3 is an enlarged top plan view of the post bushing cap; and

FIG. 4 is a side elevation of the bushing cap.

DETAILED DESCRIPTION OF THE PREFERRED EMBODIMENTS

Referring first to FIGS. 1 and 2, a major component of the pet exerciser shown is the tension or extension spring 10 which has double looped rings, one on each end as shown at 11 and 12. The spring 10 is anchored in the top 13 of galvanized post or pipe 15 which is vertically positioned with the lower end embedded in concrete 16. The post or pipe 15 is the other major component. The concrete is poured into a hole 18 in the ground 19.

One or more holes indicated at 22 are provided in the lower end of the post to allow concrete to enter and fill the interior of the lower end of the post to a drain hole 23 at the top of the concrete and at grade which prevents water from collecting inside the post.

The top of the pipe or post is provided with a plastic cap or bushing 25, seen in more detail in FIGS. 3 and 4. Just below the bushing, the spring is anchored to the top of the post by a suitable fastener such as the hex-head bolt 27, flat washers 28, lock washer 29 and nut 30. The bolt extends through the hole 31 in the post and the lower double ring or loop 12 of the spring 10, and anchors the spring in the top of the post, as seen more clearly in FIG. 2.

Referring also to FIGS. 3 and 4, it will be seen that the bushing 25 includes a rounded cap 33 which forms a downwardly facing shoulder 34, which seats on the top of the post. The cap projects from the top of the post and keeps the spring from contacting the top edge of the post. The bushing includes a reduced diameter cylindrical portion 36 which projects down into the top of the post. The exterior lower edge of cylindrical portion 36 includes an angle pilot surface 37 to facilitate the insertion of the bushing into the top of the post. The interior of the bushing includes the through-hole 38 through which the lower end of the spring extends with some clearance. The bushing is a snug fit in the top of the post and protects both the spring and the top of the post from abrasion and wear during use.

A large pet is tethered to the upper or top rung of the spring by a leash 40 secured to the top double ring 11 of the spring 10. It is preferred that the leash 40 be of the braided nylon coated steel-wire type, which aids in resisting entanglement. As the large pet moves away from the post, the spring will not only elongate, but also flex in a lateral direction following the movement of the pet. The exerciser provides significant decelerating strain relief as the pet approaches the limits of motion. The circular universal area of movement is only limited by the length of the tether or leash. No trees or other obstacles should be within the circular range.

It can now be seen that there is provided a large pet exerciser, which provides significant decelerating strain relief protecting a large pet while providing freedom of exercising movement. The strain relief also helps protect the post providing a long useful life for the pet exerciser, which is made with a few inexpensive readily available parts.

Although the invention has been shown and described with respect to certain preferred embodiments, it is obvious that equivalent alterations and modifications will occur to others skilled in the art upon the reading and understanding of this specification. It will be appreciated that suitable features in one of the embodiments may be incorporated in another of the embodiments, if desired. The present invention includes all such equivalent alterations and modifications, and is limited only be the scope of the claims.

What is claimed is:

1. A pet exerciser comprising a hollow post embedded in the ground, an extension spring having an upper and lower end, means operative to anchor the lower end of the spring directly in the interior top of said hollow post with the upper end projecting above and free of the post, means to tether a pet directly to said upper end of said spring, and means to embed the lower end of the hollow post in concrete, with said concrete filling the interior lower end of said hollow post.

2. A pet exerciser as set forth in claim 1, wherein said extension spring is provided with a ring at each said upper and lower end.

3. A pet exerciser as set form in claim 2, including a fastener extending through the top of the post and through the ring at the lower end of the spring.

4. A pet exerciser as set forth in claim 3, wherein said fastener is a nut and bolt assembly.

5. A pet exerciser as set forth in claim 4, including a bushing in the top of said post through which said spring projects.

6. A pet exerciser comprising a post embedded in the ground, an extension spring having an upper and lower end, means operative to anchor the lower end of the spring in the top of said post with the upper end projecting above and free of the post, means to tether a pet directly to said upper end of said spring, means to embed the lower end of the post in concrete, said post being hollow and said concrete filling the lower end of said post, and a drain hole in said post at the level of concrete embedment.

7. A pet exerciser comprising a post embedded in the ground, an extension spring having an upper and lower end, means operative to anchor the lower end of the spring in the top of said post with the upper end projecting above and free of the post, means to tether a pet directly to said upper end of said spring, and means to embed the lower end of the post in concrete, said post being hollow and said concrete filling the lower end of said post, and a bushing in the top of the post through which the spring projects.

* * * * *